(12) United States Patent  (10) Patent No.: US 7,591,751 B2
Sudorowski et al.  (45) Date of Patent: Sep. 22, 2009

(54) FOUR PINION DIFFERENTIAL WITH CROSS PIN RETENTION UNIT AND RELATED METHOD

(75) Inventors: Christopher M. Sudorowski, Westland, MI (US); Heather A. Moore, Ortonville, MI (US); Joseph S. Balenda, II, Grand Blanc, MI (US)

(73) Assignee: American Axle & Manufacturing, Inc., Detroit, MI (US)

( * ) Notice: Subject to any disclaimer, the term of this patent is extended or adjusted under 35 U.S.C. 154(b) by 387 days.

(21) Appl. No.: 11/736,759

(22) Filed: Apr. 18, 2007

(65) Prior Publication Data

US 2008/0261748 A1  Oct. 23, 2008

(51) Int. Cl.
 *F16H 48/08* (2006.01)
(52) U.S. Cl. ...................................... 475/230
(58) Field of Classification Search .................. 475/230, 475/231, 336
 See application file for complete search history.

(56) References Cited

U.S. PATENT DOCUMENTS

| 696,704 | A | * | 4/1902 | Allen | 475/243 |
|---|---|---|---|---|---|
| 1,115,536 | A | * | 11/1914 | Hinkley | 475/230 |
| 1,322,689 | A | * | 11/1919 | Griffing | 475/247 |
| 1,461,102 | A | | 7/1923 | Sternbergh | |
| 2,808,740 | A | * | 10/1957 | Boden | 475/230 |
| 2,971,404 | A | | 2/1961 | Thornton | |
| 3,593,595 | A | | 7/1971 | Taylor | |
| 3,651,713 | A | | 3/1972 | Mueller | |
| 3,894,447 | A | | 7/1975 | Michael | |
| 3,974,717 | A | | 8/1976 | Breed et al. | |
| 4,363,248 | A | | 12/1982 | Brisabois | |
| 4,467,672 | A | | 8/1984 | Lamy | |
| 4,722,244 | A | | 2/1988 | Tsuchiya et al. | |
| 4,901,599 | A | | 2/1990 | Irwin | |
| 5,059,160 | A | | 10/1991 | Raniero | |
| 5,186,694 | A | * | 2/1993 | Cooper | 475/230 |
| 5,545,102 | A | | 8/1996 | Burgman et al. | |
| 5,647,814 | A | | 7/1997 | Krisher | |
| 6,254,505 | B1 | | 7/2001 | Forrest | |
| 6,699,154 | B2 | * | 3/2004 | Orr et al. | 475/230 |
| 7,025,702 | B2 | | 4/2006 | Saito et al. | |
| 7,081,065 | B2 | | 7/2006 | Sudou | |
| 7,155,997 | B2 | | 1/2007 | Santelli | |
| 2005/0070394 | A1 | * | 3/2005 | Sugeta et al. | 475/230 |
| 2008/0242469 | A1 | * | 10/2008 | Jenski et al. | 475/231 |
| 2009/0017962 | A1 | * | 1/2009 | Isken et al. | 475/230 |
| 2009/0075777 | A1 | * | 3/2009 | Han et al. | 475/230 |
| 2009/0088285 | A1 | * | 4/2009 | Downs et al. | 475/230 |

* cited by examiner

*Primary Examiner*—Sherry Estremsky
(74) *Attorney, Agent, or Firm*—Harness, Dickey & Pierce, P.L.C.

(57) ABSTRACT

A differential having four pinions supported for rotation on cross pins within a differential case. The differential employs a retainer system for securing the cross pins relative to the differential case. The retainer system can include a retainer, such as a clip or a pair of roll pins, that can secure at least one of the cross pins in place.

21 Claims, 8 Drawing Sheets

FOUR PINION DIFFERENTIAL WITH CROSS PIN RETENTION UNIT AND RELATED METHOD

FIELD OF THE INVENTION

The present disclosure generally relates to vehicle drivelines and more particularly to a differential for a vehicle driveline.

One type of automotive differential employs a differential housing, a pair of bevel side gears and a plurality of bevel pinions. Some application employ a single pair of bevel pinions that are meshingly engaged with the bevel side gears and supported for rotation in the differential housing about an axis via a single pinion shaft. Vehicle differentials configured for heavier duty applications typically employ two pair of bevel pinions that are meshingly engaged with the bevel side gears. A first pair of the bevel pinions are supported for rotation about a first pinion axis by a first pinion shaft, while a second pair of the bevel pinions are supported about a second pinion axis by a second pinion shaft. In some heavy duty differentials, the first and second pinion shafts are part of a unitarily formed cross-shaped structure. Some other heavy duty differentials employ a configuration in which an aperture or notch is formed in one or both of the first and second pinion shafts. The aperture or notch in one of the first and second pinion shafts provides clearance for the other one of the first and second pinion shaft. Still other heavy duty differentials employ a configuration in which the second pinion shaft is formed by two shaft members that terminate proximate the first pinion shaft. Examples of this configuration include U.S. Pat. No. 7,155,997.

While such configurations are relatively robust, the coupling of the first and second pinion shafts to the differential housing can be complex and/or costly. Accordingly, there remains a need in the art for an improved heavy duty differential having multiple pinion shafts that can be robustly secured relative to the differential housing in a relatively simple, efficient and cost-effective manner.

SUMMARY OF THE INVENTION

In one form, the present teachings provide a differential for an automotive driveline. The differential includes a differential housing, first and second bevel side gears, a first pinion shaft, a first set of bevel pinions, a second set of bevel pinions and a retainer assembly. The differential housing defines an internal cavity, an axle bore and first and second pinion bores. The axle bore is disposed through the differential housing and intersects the internal cavity. The axle bore is disposed about a rotational axis of the differential housing. The first and second pinion bores are perpendicular to one another and perpendicular to the rotational axis. The first and second bevel side gears are received in the internal cavity and disposed about the rotational axis. The first pinion shaft is received in the first pinion bore and coupled to the differential housing. The first set of bevel pinions are rotatably disposed on the first pinion shaft and meshingly engaged with the first and second bevel side gears. The second set of bevel pinions is meshingly engaged with the first and second bevel side gears. The retainer assembly is received in the second pinion bore and supports the second set of bevel pinions for rotation thereon. The retainer assembly includes first and second pin portions and a clip. The first pin portion is received in a first side of the second pinion bore and through a first one of the second set of bevel pinions. The second pin portion is received in a second side of the second pin bore and through a second one of the second set of bevel pinions. The clip has a plurality of leg members, each of which being received through a hole formed in at least two of the first pin portion, the second pin portion and the first pinion shaft. At least one of the leg members carries a deflectable barb that deflects to an engaging position after the clip has been installed. The engaging position resists withdrawal of the leg members from the holes.

In another form, the present teachings provide a method for assembling an automotive differential. The method includes: providing a differential case having an internal cavity; installing a first bevel side gear into the internal cavity for rotation about a rotational axis; meshingly engaging a first set of bevel pinions to the first bevel side gear for rotation about a first pinion axis; meshingly engaging a second set of bevel pinions to the first bevel side gear for rotation about a second pinion axis; positioning a collar in the internal cavity radially inwardly of the first and second sets of bevel pinions; installing first and second pin portions to the first set of bevel pinions, each of the first and second pin portions extending through the collar, through an associated one of the first set of bevel pinions and engaging the differential case; installing a first pinion shaft to the second set of bevel pinions, the first pinion shaft extending through the collar and the second set of bevel pinions, the first pinion shaft having opposite ends that engage the differential case; and installing a retainer to at least two of the first pin portion, the second pin portion and the first pinion shaft, the retainer being received radially inwardly of the collar, the retainer limiting axial movement of the first and second pin portions along a pinion axis about which the first set of bevel pinions rotate.

In still another form, the teachings of present disclosure provide a differential for an automotive driveline. The differential can include a differential housing, first and second bevel side gears, a first pinion shaft, a first set of bevel pinions, a second set of bevel pinions, and a retainer assembly. The differential housing defines an internal cavity, an axle bore and first and second pinion bores. The axle bore is disposed through the differential housing and intersects the internal cavity. The axle bore is disposed about a rotational axis of the differential housing. The first and second pinion bores are perpendicular to one another and perpendicular to the rotational axis. The first and second bevel side gears are received in the internal cavity and disposed about the rotational axis. The first pinion shaft is received in the first pinion bore and coupled to the differential housing. The first set of bevel pinions are rotatably disposed on the first pinion shaft and meshingly engaged with the first and second bevel side gears. The second set of bevel pinions are meshingly engaged with the first and second bevel side gears. The retainer assembly is received in the second pinion bore and supports the second set of bevel pinions for rotation thereon. The retainer assembly includes a collar, first and second pin portions and at least one retainer. The collar is an annular structure that is disposed about the rotational axis radially inwardly of the first and second sets of bevel pinions. The collar has a first set of collar apertures and a second set of collar apertures. The first pinion shaft is received through the first set of collar apertures. The first pin portion is received in a first side of the second pinion bore, a first one of the second set of bevel pinions and the second set of collar apertures. The second pin portion is received in a second side of the second pin bore, a second one of the second set of bevel pinions and the second set of collar apertures. The retainer engages at least one of the first and second pin portions at a location radially inward of the collar to limit movement of the first and second pin portions along a pinion axis about which the set of second bevel pinions rotate. The retainer is pushed through holes that are formed in at least two of the first pin portion, the second pin portion and the first pinion shaft. The holes are not formed in the collar.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

Additional advantages and features of the present invention will become apparent from the subsequent description and the appended claims, taken in conjunction with the accompanying drawings, wherein:

DETAILED DESCRIPTION OF THE PREFERRED EMBODIMENTS

Figure 1:
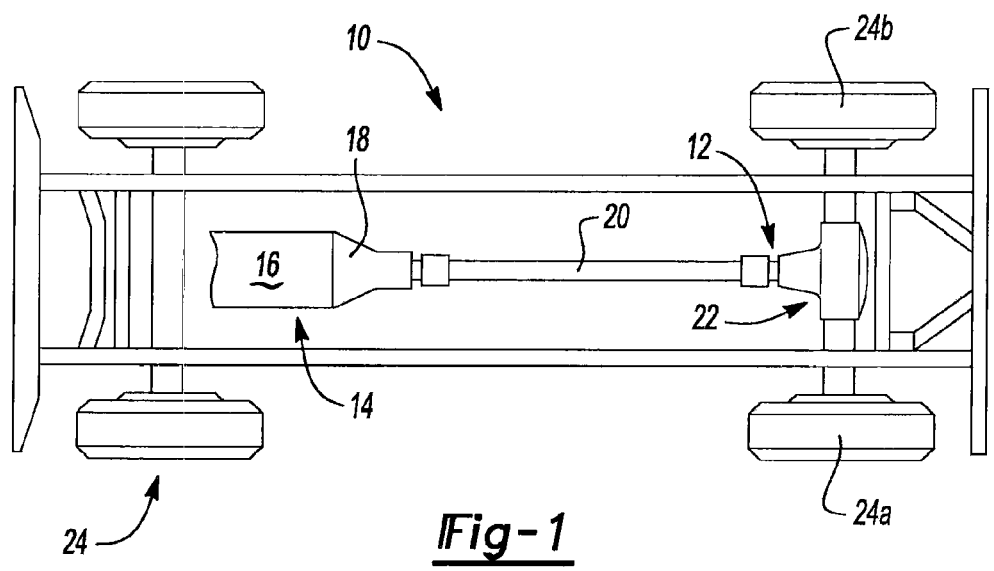
FIG. 1 is a schematic illustration of an exemplary vehicle having a differential unit constructed in accordance with the teachings of the present disclosure.

With reference to FIG. 1 of the drawings, a vehicle having a differential assembly that is constructed in accordance with the teachings of the present disclosure is generally indicated by reference numeral 10. The vehicle 10 can include a driveline 12 that is drivable via a connection to a power train 14. The power train 14 can include an engine 16 and a transmission 18. The driveline 12 can include a drive shaft 20, a rear axle 22 and a plurality of wheels 24. The engine 16 can be mounted in an in-line or longitudinal orientation along the axis of the vehicle 10 and its output can be selectively coupled via a conventional clutch to the input of the transmission 18 to transmit rotary power (i.e., drive torque) therebetween. The input of the transmission 18 can be commonly aligned with the output of the engine 16 for rotation about a rotary axis.

The transmission 18 can also include an output and a gear reduction unit. The gear reduction unit can be operable for coupling the transmission input to the transmission output at a predetermined gear speed ratio. The drive shaft 20 can be coupled for rotation with the output of the transmission 18. Drive torque can be transmitted through the drive shaft 20 to the rear axle 22 where it can be selectively apportion in a predetermined manner to the left and right rear wheels 24a and 24b, respectively.

Figure 2:
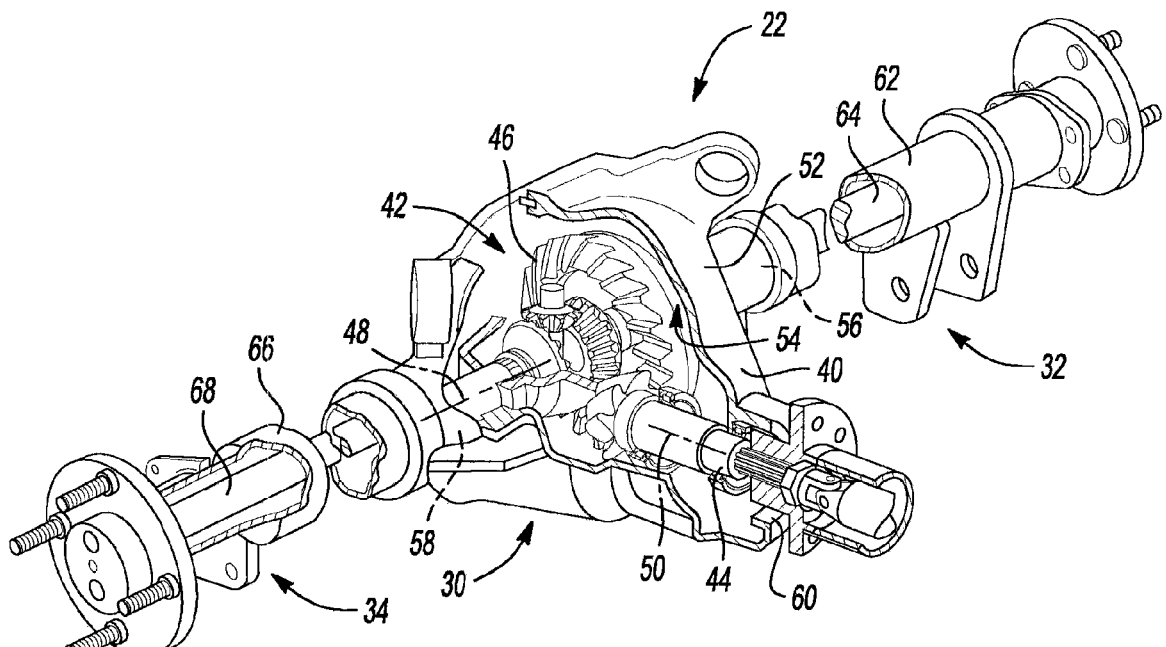
FIG. 2 is a partially broken away perspective view of a portion of the vehicle of FIG. 1 illustrating the rear axle assembly in more detail.

With additional reference to FIG. 2, the rear axle 22 can include a differential assembly 30, a left axle shaft assembly 32 and a right axle shaft assembly 34. The differential assembly 30 can include a housing 40, a differential unit 42, an input pinion 44 and a ring gear 46. The housing 40 can support the differential unit 42 for rotation about a first axis 48 and can further support the input pinion 44 for rotation about a second axis 50 that can be perpendicular to the first axis 48.

The housing 40 can be initially formed in a suitable casting process and thereafter machined as required. The housing 40 can include a wall member 52 that can define a central cavity 54 having a left axle aperture 56, a right axle aperture 58, and an input shaft aperture 60.

The left axle shaft assembly 32 can include a first axle tube 62 fixed to the left axle aperture 56 and a first axle half-shaft 64 that can be supported for rotation in the first axle tube 62 about the first axis 48. Similarly, the right axle shaft assembly 34 can include a second axle tube 66 that can be fixed to the right axle aperture 58 and which can support a second axle half-shaft 68 for rotation about the first axis 48.

The input pinion 44 can be disposed in the input shaft aperture 60 and can meshingly engage the ring gear 46, which can be fixedly but removably coupled to the differential unit 42. It will be appreciated that rotary power transmitted to the input pinion 44 from the drive shaft 20 is employed to drive the differential unit 42 about the first axis 48 via the ring gear 46 in a conventional manner. The differential unit 42 can transmit drive torque to the first and second axle half-shafts 64 and 68 in a predetermined manner.

Figure 3:
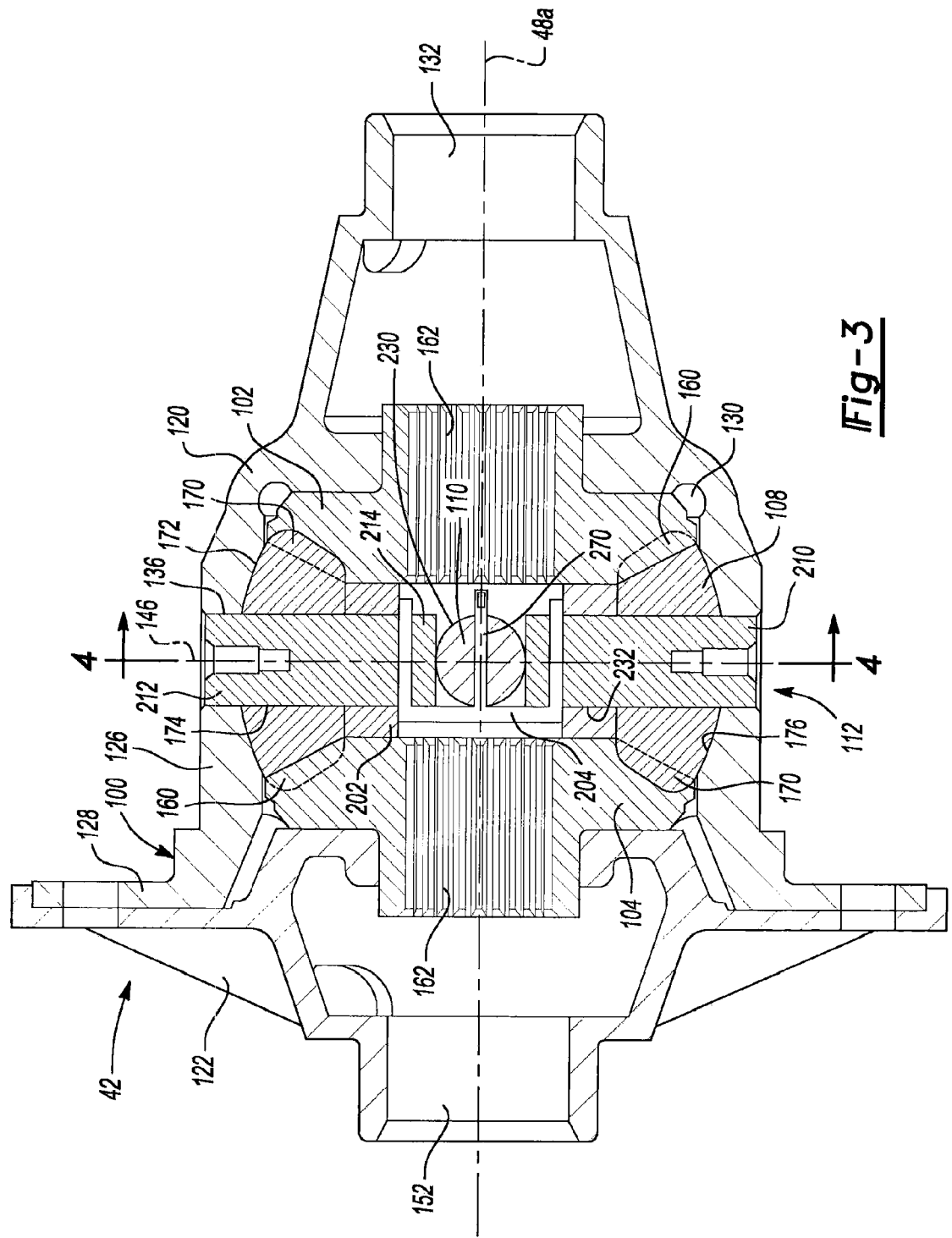
FIG. 3 is a sectional view of a portion of the vehicle of FIG. 1, illustrating the differential unit in longitudinal cross section.
Figure 4:
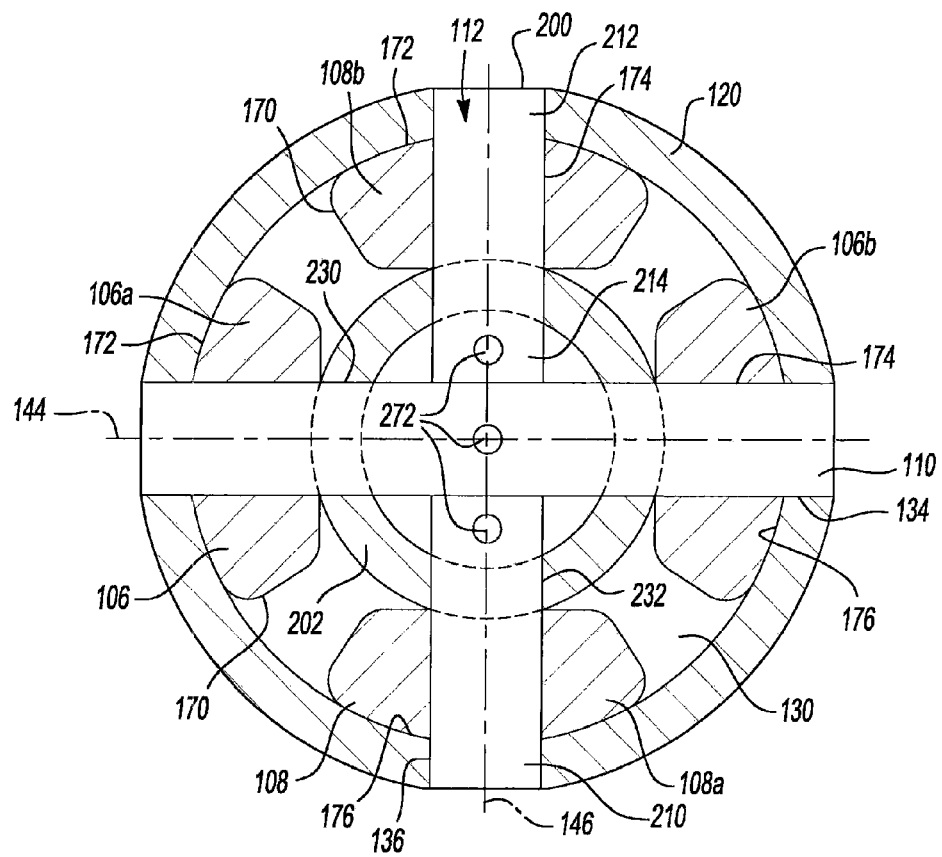
FIG. 4 is a sectional view taken along the line 4-4.

With additional reference to FIGS. 3 and 4, the differential unit 42 can be disposed within the central cavity 54 of the housing 40 and can include a differential housing 100, first and second bevel side gears 102 and 104, respectively, a first set of bevel pinions 106, a second set of bevel pinions 108, a first pinion shaft 110 and a retainer system 112.

The differential housing 100 can include a differential case 120 and a differential cover 122. The differential case 120 can have a body 126 and a flange 128 that can be disposed generally perpendicular to the rotational axis 48a of the differential unit 42. The body 126 can define an internal cavity 130, a first axle bore 132, a first pinion shaft bore 134 and a second pinion shaft bore 136. The first axle bore 132 can be disposed about the rotational axis 48a of the differential unit 42 and can intersect the internal cavity 130 on an end of the body 126 opposite the flange 128. The first pinion shaft bore 134 can extend through the body 126 along a first pinion axis 144 that is generally perpendicular to the rotational axis 48a of the differential unit 42. The second pinion shaft bore 136 can extend through the body 126 along a second pinion axis 146 that is generally perpendicular to both the rotational axis 48a of the differential unit 42 and the first pinion axis 144. The differential cover 122 can be coupled to the differential case 120 to substantially close an end of the differential case 120 opposite the first axle bore 132. The differential cover 122 can define a second axle bore 152 that can be arranged about the rotational axis 48a of the differential unit 42. The first and second axle bores 132 and 152 can be sized and shaped to engage an end of an associated one of the first and second axle half-shafts 64 and 68 (FIG. 2) in a conventional manner that permits drive torque to be transmitted between the differential housing 100 and the first and second axle half shafts 64 and 68 (FIG. 2).

The first and second bevel side gears 102 and 104 can be conventional in their construction and as such, need not be discussed in significant detail herein. Briefly, the first and second bevel side gears 102 and 104 can include a plurality of gear teeth 160 and a central splined aperture 162 that is configured to non-rotatably but axially slideably engage a corresponding one of the first and second axle half shafts 64 and 68 (FIG. 2) to permit drive torque to be transmitted between the first and second bevel side gears 102 and 104 and the first and second axle half shafts 64 and 68 (FIG. 2). The first and second bevel side gears 102 and 104 can be received in the internal cavity 130 on opposite sides of the differential case 120 such that they are aligned about the rotational axis 48a of the differential unit 42 and abutted against the differential case 120 and the differential cover 122, respectively.

The first and second sets of bevel pinions 106 and 108 can be can be conventional in their construction and as such, need not be discussed in significant detail herein. Briefly, the first and second sets of bevel pinions 106 and 108 can include gear teeth 170 that can meshingly engage the first and second bevel side gears 102 and 104, a surface 172 opposite the gear teeth 170 that can be configured to engage the differential case 120, and a through bore 174. In the particular example provided, the opposite surface 172 is arcuate in shape and conforms to the arcuate recesses 176 that are formed in the internal cavity 130 of the differential case 120 at the locations where the first and second pinion shaft bores 134 and 136 intersect the interior side of the wall of the differential case 120. The first set of bevel pinions 106 can include a first pinion 106a and a second pinion 106b that can be received in the arcuate recesses 176 that are associated with the first pinion shaft bore 134. The second set of bevel pinions 108 can include a first pinion 108a and a second pinion 108b that can be received in the arcuate recesses 176 that are associated with the second pinion shaft bore 136.

The first pinion shaft 110 can be received in the first pinion shaft bore 134 and through the through bores 174 in the first and second pinions 106a and 106b of the first set of bevel pinions 106.

Figure 5:
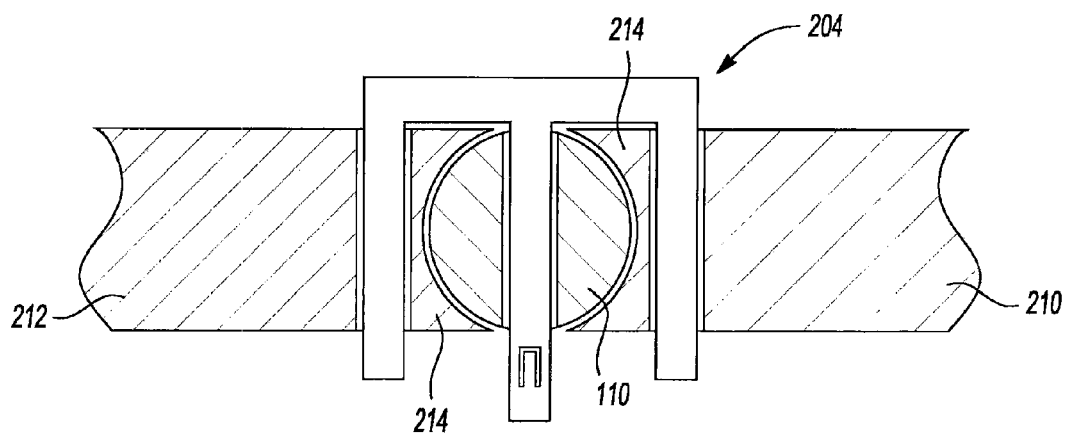
FIG. 5 is a sectional view of a portion of another differential unit constructed in accordance with the teachings of the present disclosure, the figure illustrating the arrangement of the first and second pinion shafts in more detail.

The retainer system 112 can include a second pinion shaft 200, a collar 202 and a retainer 204. The second pinion shaft 200 can support the second set of bevel pinions 108 for rotation in the internal cavity 130 about the second pinion axis 146. The second pinion shaft 200 can include a first pin portion 210 on which the first pinion 108a is rotatably disposed, and a second pin portion 212 on which the second pinion 108b is rotatably disposed. The first and second pin portions 210 and 212 can be received in the second pinion shaft bore 136 along the second pinion axis 146. In the particular example provided, the first and second pin portions 210 and 212 are discrete cylindrically-shaped members having inner ends 214 that are generally flat and orthogonal to the second pinion axis 146. It will be appreciated, however, that the first and second pin portions 210 and 212 could have inner ends 214 that conform to a shape of at least a portion of the first pinion shaft 110, an example of which is shown in FIG. 5.

Returning to FIGS. 3 and 4, the collar 202 can be disposed in the internal cavity 130 radially inward of the first and second sets of bevel pinions 106 and 108. The collar 202 can be an annular structure having a first set of apertures 230, which can be sized to receive the first pinion shaft 110 therethrough, and a second set of apertures 232 that are sized to receive the first and second pin portions 210 and 212 therethough. Accordingly, it will be appreciated that the collar 202 supports the inner ends 214 of the first and second pin portions 210 and 212 on a side opposite the wall of the differential case 120.

Figure 6:
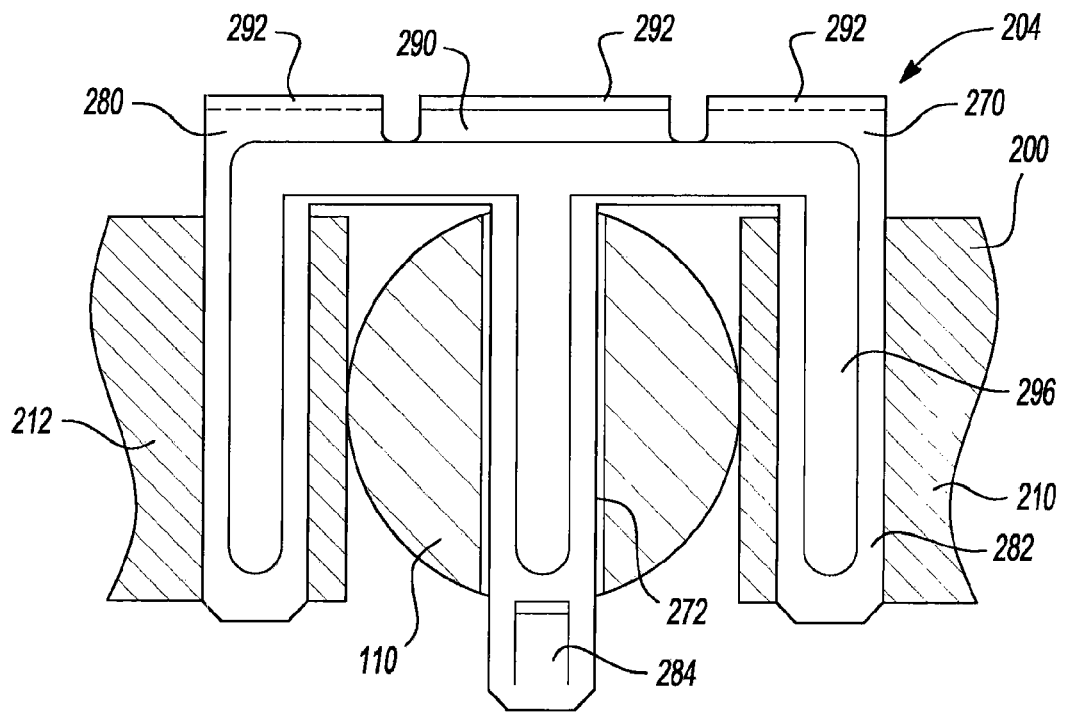
FIG. 6 is a front view of a portion of the vehicle of FIG. 1, illustrating the retainer in more detail.
Figure 7:
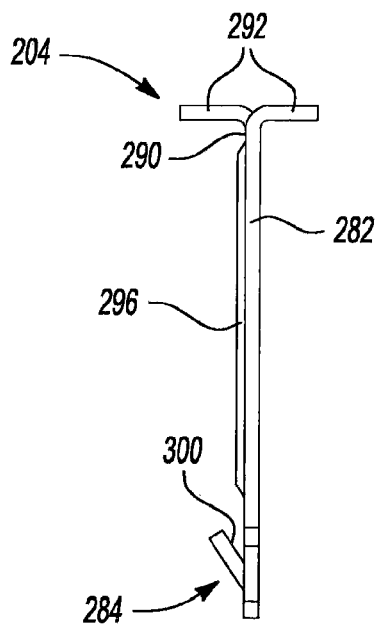
FIG. 7 is a side elevation view of the retainer of FIG. 6.

The retainer 204 can comprise any appropriate means for securing the first and second pinion shafts 110 and 200 relative to the differential case 120. In the example provided, the retainer 204 includes a clip 270 that is received through holes 272 formed in each of the first pinion shaft 110, the first pin portion 210 and the second pin portion 212 at a location that is radially inward of the collar 202. With reference to FIGS. 6 and 7, the clip 270 be a stamping that can be formed of a resilient spring steel material. The clip 270 can include a clip body 280, a plurality of clip legs 282 and one or more engagement members 284. The clip body 280 can have a first portion 290 that can be coupled to each of the clip legs 282 and one or more second portions 292 that can be generally transverse to the first portion 290 to provide lateral stiffness for the clip body 280 and/or the clip legs 282. In the particular example provided, the quantity of second portions 292 corresponds to the quantity of the clip legs 282. The clip legs 282 can extend from the first portion 290 of the clip body 280 on a side opposite the second portion 292 and can be sized to be received in the holes 272. A rib 296 can be embossed into the first portion 290 of the clip body 280 and the clip legs 282 to stiffen these portions of the clip 270.

Each engagement member 284 can be coupled to an end of an associated one of the clip legs 282 on a side opposite the clip body 280. A single engagement member 284 is carried by the center clip leg 282 in the example shown, but it will be appreciated that the engagement member 284 could be carried by two or more of the clip legs 282. The engagement member 284 can be configured to resist the withdrawal of the clip legs 282 from the holes 272. In the particular example provided, the engagement member 284 comprises a resilient barb 300 that deflects inwardly (toward the center clip leg 282) when the center clip leg 282 is inserted into the hole 272 in the first pinion shaft 110 and thereafter deflect outwardly after the engagement member 284 passes wholly through the first pinion shaft 110. When positioned in the outwardly deflected position, the engagement member 284 can contact the first pinion shaft 110 when a withdrawing force is applied to the clip 270 to resist or limit movement of the clip 270 relative to the first and second pinion shafts 110 and 200. It will be appreciated that the engagement member 284 can be need not employ resilient engaging member that "locks" upon insertion but could also comprise a tab that is deformed (e.g., bent perpendicular to the clip legs 282) after the engagement member has been wholly inserted through an associated one of the holes 272.

Returning to FIGS. 3 and 4, the clip 270 can be installed to the holes 272 in a direction that can be generally parallel to the rotational axis 48a of the differential unit 42. Accordingly, it will be appreciated that the first and second pinion shafts 110 and 200 can be secured to one another in a cost-efficient manner.

Figure 8:
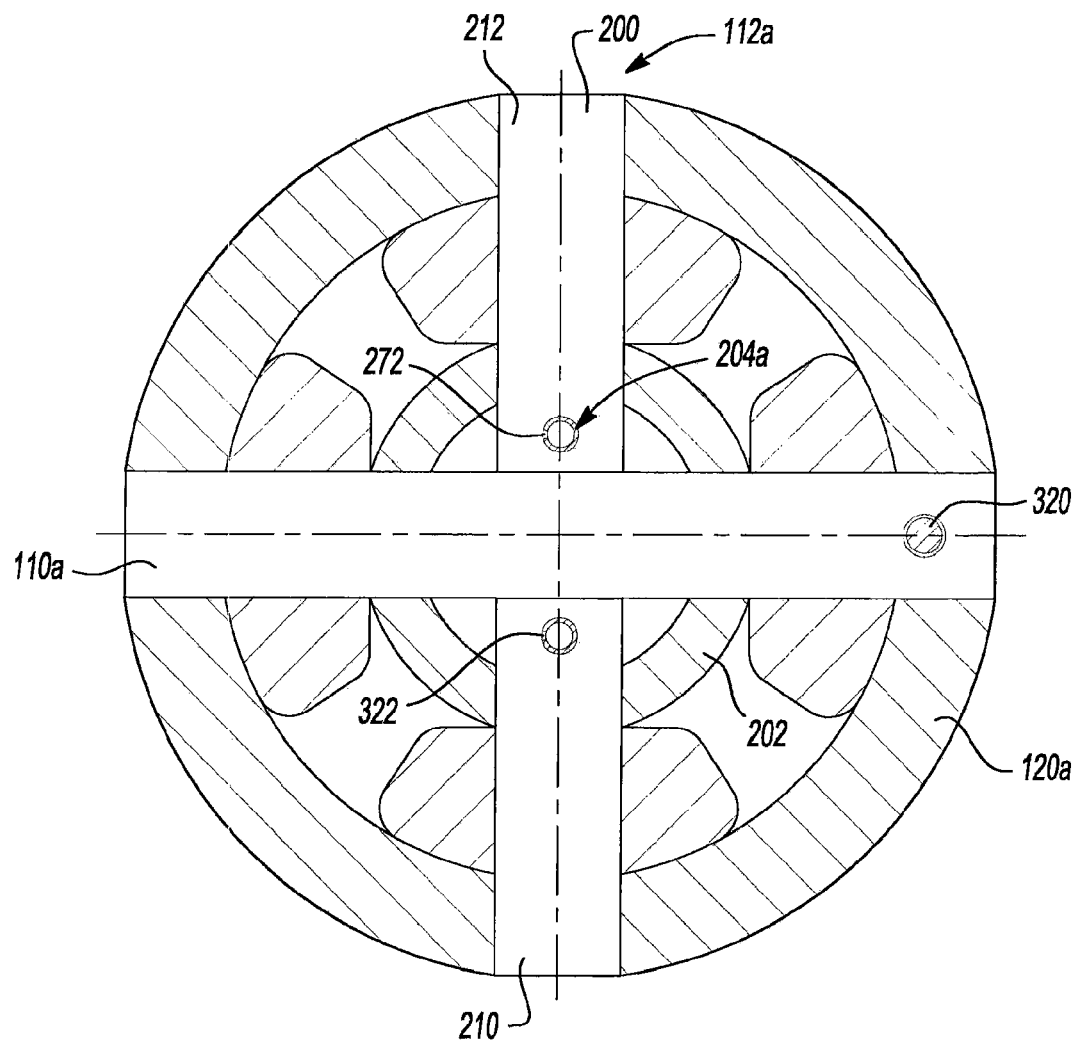
FIG. 8 is a sectional view similar to that of FIG. 4 but illustrating another differential unit constructed in accordance with the teachings of the present disclosure.
Figure 9:
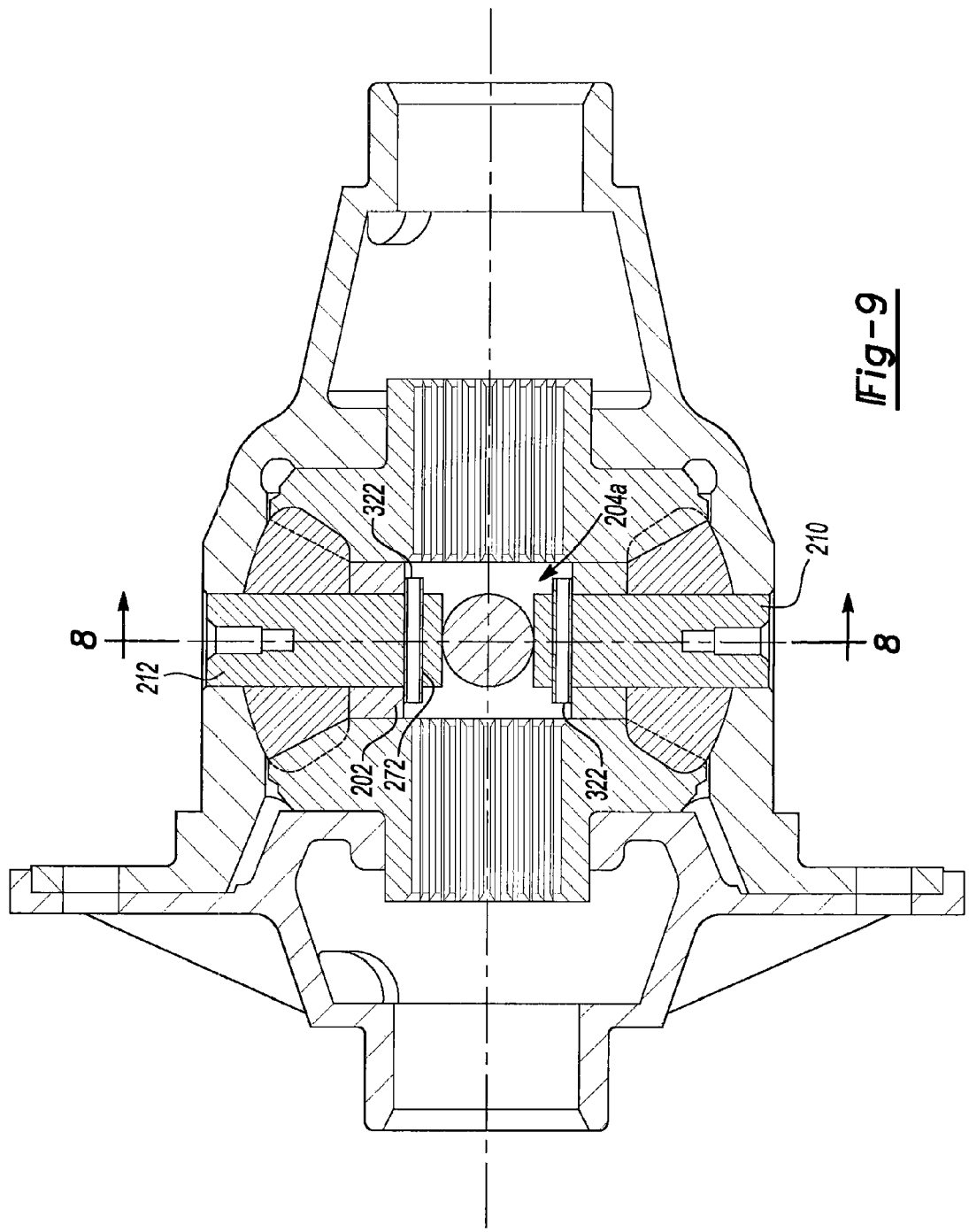
FIG. 9 is a longitudinal section view of the differential unit of FIG. 8.

While the retainer system 112 has been illustrated and described herein as including a clip that secures discrete pin portions to the first pinion shaft 110, it will be appreciated that a differential constructed in accordance with the teachings of the present disclosure could be constructed somewhat differently. For example, the retainer system 112a could include a fastener 320 for securing the first pinion shaft 110a to the differential case 120a and a retainer 204a for securing the first and second pin portions 210 and 212 relative to the differential case 120a as shown in FIGS. 8 and 9. The retainer 204a can include a pair of roll pins 322 that can be received in the holes 272 in the first and second pin portions 210 and 212. The roll pins 322 can frictionally engage the first and second pin portions 210 and 212 and can extend outwardly so as to inhibit withdrawal of the first and second pin portions 210 and 212 from the collar 202.

Figure 8A:
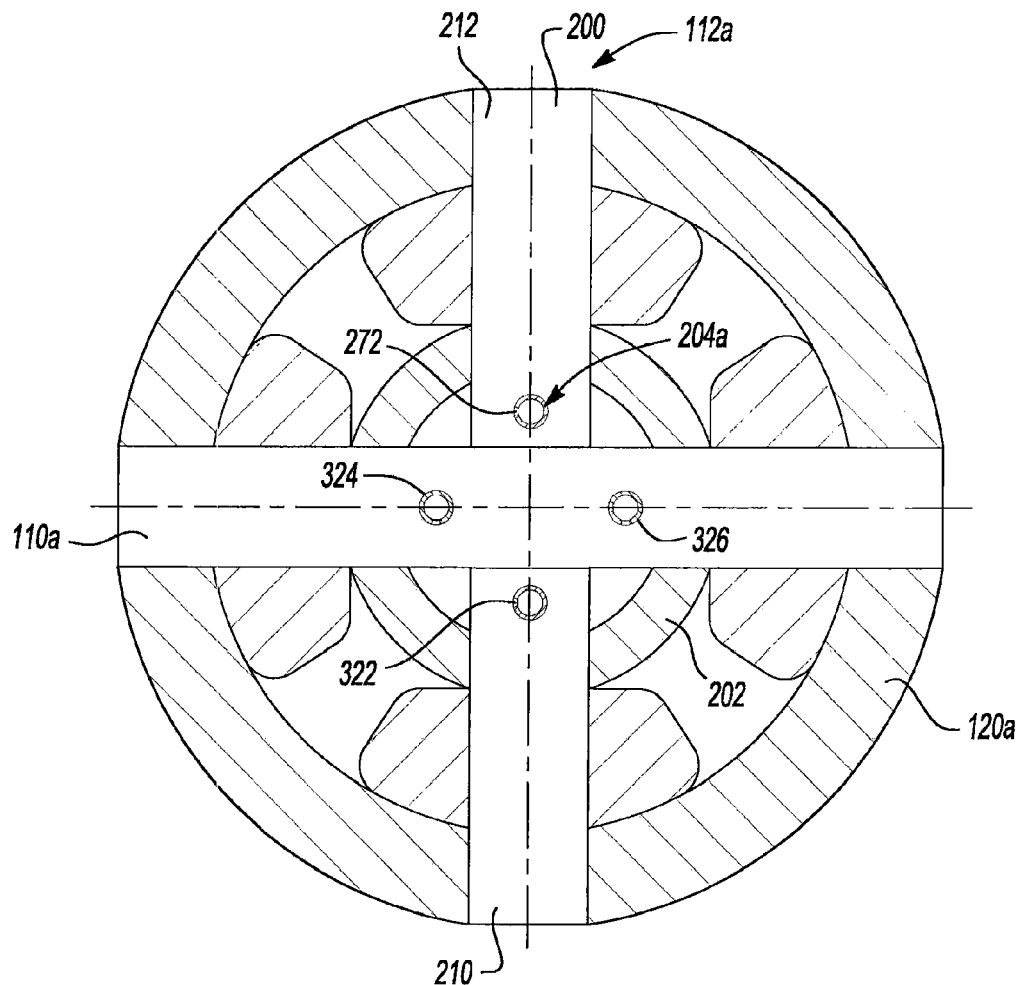
FIG. 8A is a sectional view similar to that of FIG. 8, but illustrating a different means for retaining the first pinion shaft to the differential case.
Figure 10:
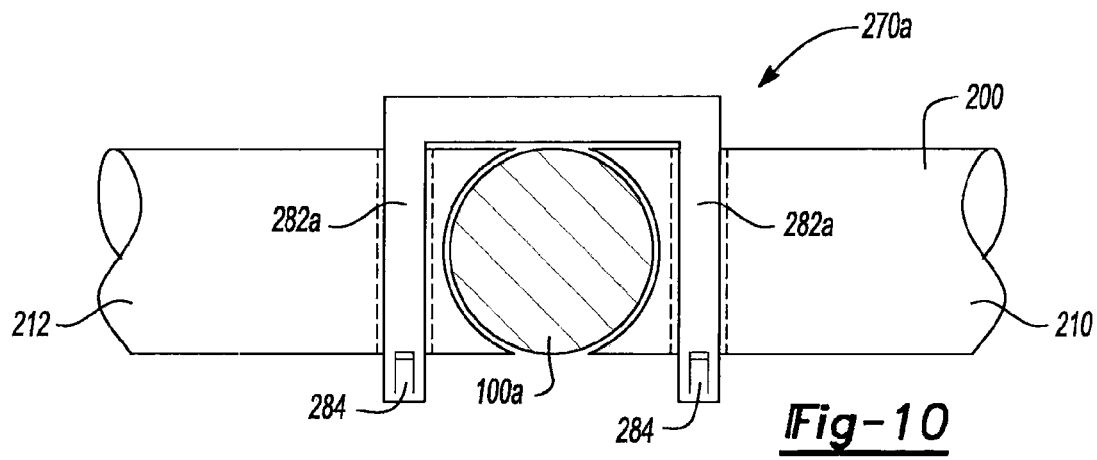
FIG. 10 is a sectional view of a portion of another differential unit constructed in accordance with the teachings of the present disclosure.

In one alternative, one or more roll pins 324 can be employed in lieu of the fastener 320 to secure the first pinion shaft 110a relative to the differential case 120a as shown in FIG. 8A. In this example, the roll pins 324 are received in corresponding holes 326 in the first pinion shaft 110a that are located radially inwardly of the collar 202. In another alternative which is illustrated in FIG. 10, a clip 270a having a pair of clip legs 282a can be employed to secure the first and second pin portions 210 and 212 to one another. The clip 270a can be generally similar to the clip 270 of FIG. 6, except that each of the clip legs 282a includes an engagement member 284.

Figure 11:
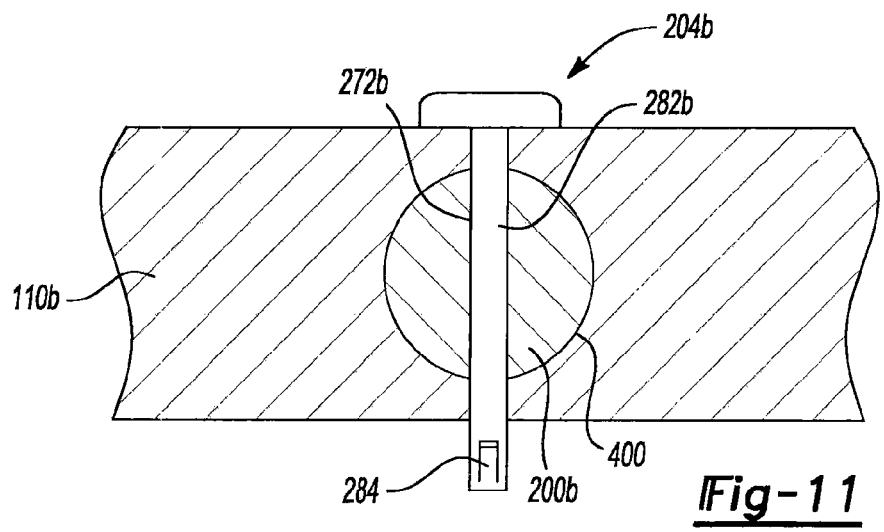
FIG. 11 is a sectional view of a portion of yet another differential unit constructed in accordance with the teachings of the present disclosure.

In the example of FIG. 11, the first pinion shaft 110b is relatively larger in diameter than the second pinion shaft 200b. An aperture 400 can be formed through the first pinion shaft 110b through which the second pinion shaft 200b can extend. Configuration in this manner permits the first and second pin portions (not specifically shown) to be a part of a unitary structure. A hole 272b can be formed through the first and second pinion shafts 110b and 200b. The retainer 204b can include a single clip leg 282b that can be received through the hole 272b to thereby couple the first and second pinion shafts 110b and 200b to one another. The clip leg 282b can include an engagement member 284.

Figure 12:
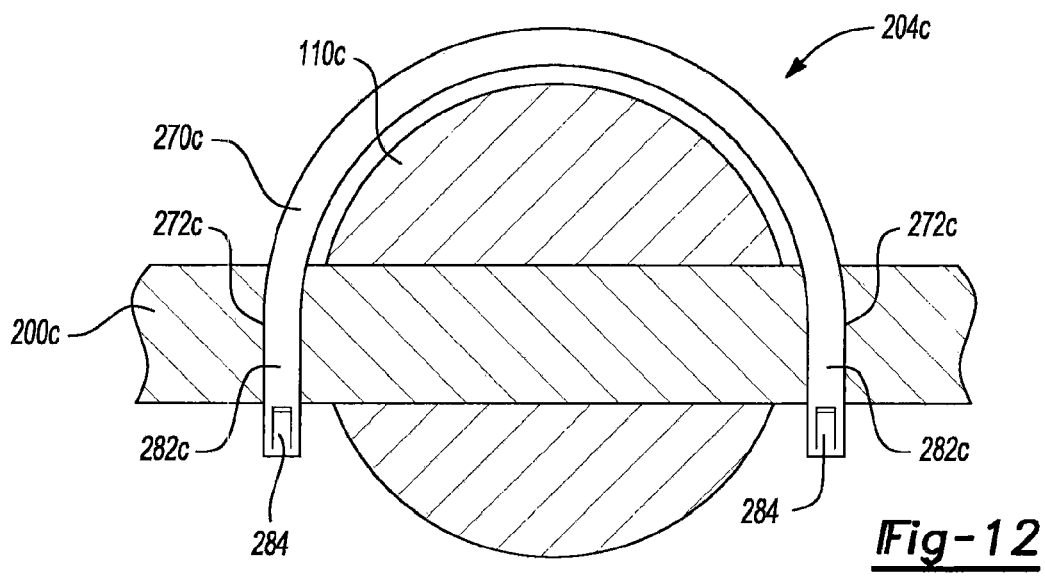
FIG. 12 is a sectional view of a portion of still another differential unit constructed in accordance with the teachings of the present disclosure.

The example of FIG. 12 is similar to that of FIG. 11, except that the holes 272c are only formed through the second pinion shaft 200c at locations that are outboard of the first pinion shaft 110c. The retainer 204c can be a clip 270c having two clip legs 282c that are received through the holes 272c. An engagement member 284 can be coupled to each of the clip legs 282c.

While the invention has been described in the specification and illustrated in the drawings with reference to a preferred embodiment, it will be understood by those skilled in the art that various changes may be made and equivalents may be substituted for elements thereof without departing from the scope of the invention as defined in the claims. In addition, many modifications may be made to adapt a particular situation or material to the teachings of the invention without departing from the essential scope thereof. Therefore, it is intended that the invention not be limited to the particular embodiment illustrated by the drawings and described in the specification as the best mode presently contemplated for carrying out this invention, but that the invention will include any embodiments falling within the foregoing description and the appended claims.

What is claimed is:

1. A differential for an automotive driveline, the differential comprising:

a differential housing defining an internal cavity, an axle bore and first and second pinion bores, the axle bore being disposed through the differential housing and intersecting the internal cavity, the axle bore being disposed about a rotational axis of the differential housing, the first and second pinion bores being perpendicular to one another and perpendicular to the rotational axis;

first and second bevel side gears received in the internal cavity and disposed about the rotational axis;

a first pinion shaft received in the first pinion bore and coupled to the differential housing;

a first set of bevel pinions rotatably disposed on the first pinion shaft and meshingly engaged with the first and second bevel side gears;

a second set of bevel pinions meshingly engaged with the first and second bevel side gears; and a retainer assembly received in the second pinion bore and supporting the second set of bevel pinions for rotation thereon, the retainer assembly including a collar, first and second pin portions and at least one retainer, the collar being an annular structure that is disposed about the rotational axis radially inwardly of the first and second sets of bevel pinions, the collar having a first set of collar apertures and a second set of collar apertures, the first pinion shaft being received through the first set of collar apertures, the first pin portion being received in a first side of the second pinion bore, a first one of the second set of bevel pinions and the second set of collar apertures, the second pin portion being received in a second side of the second pinion bore, a second one of the second set of bevel pinions and the second set of collar apertures, the retainer engaging at least one of the first and second pin portions at a location radially inward of the collar to limit movement of the first and second pin portions along a pinion axis about which the set of second bevel pinions rotate, wherein the retainer is pushed through holes that are formed in at least two of the first pin portion, the second pin portion and the first pinion shaft and wherein the holes are not formed in the collar.

2. The differential of claim 1, wherein the retainer comprises a plurality of roll pins.

3. The differential of claim 1, wherein the retainer frictionally engages at least one of the first pin portion, the second pin portion and the first pinion shaft.

4. The differential of claim 1, wherein the first and second pin portions are discrete structures.

5. The differential of claim 4, wherein each of the first and second pin portions has an inner end that is disposed adjacent the first pinion shaft and wherein the inner end has an surface that is substantially parallel to the rotational axis.

6. The differential of claim 4, wherein each of the first and second pin portions has an inner end that is disposed adjacent the first pinion shaft and wherein the inner end has an surface that at least partially conforms to a corresponding portion of a surface of the first pinion shaft.

7. The differential of claim 6, wherein the corresponding portion of the surface of the first pinion shaft is cylindrically shaped.

8. The differential of claim 1, wherein the retainer is inserted to the holes in a direction that is generally parallel to the rotational axis.

9. The differential of claim 1, wherein the retainer includes a plurality of leg members and a barb that is disposed on one of the leg members, the leg members being received in the holes, the barb engaging one of the first pin portion, the second pin portion and the first pinion shaft to inhibit withdrawal of the leg portions from the holes.

10. The differential of claim 9, wherein the barb is resiliently coupled to the one of the leg members and is deflectable between an insertion position, which passes through an associated one of the holes, and an installed position in which a portion of the barb is disposed radially outwardly of the hole.

11. The differential of claim 10, wherein the holes are formed in each of the first pin portion, the second pin portion and the first pinion shaft and wherein the retainer includes three leg members.

12. The differential of claim 10, wherein the holes are formed in each of the first pin portion and the second pin portion and wherein the retainer includes two leg members.

13. The differential of claim 1, wherein the first and second pin portions are formed on a second pinion shaft.

14. The differential of claim 13, wherein one of the first and second pinion shafts has an aperture through which the other one of the first and second pinion shafts extends.

15. The differential of claim 1, wherein the retainer is a spring clip.

16. A method for assembling an automotive differential, the method comprising:
   providing a differential case having an internal cavity;
   installing a first bevel side gear into the internal cavity for rotation about a rotational axis;
   meshingly engaging a first set of bevel pinions to the first bevel side gear for rotation about a first pinion axis;
   meshingly engaging a second set of bevel pinions to the first bevel side gear for rotation about a second pinion axis;
   positioning a collar in the internal cavity radially inwardly of the first and second sets of bevel pinions;
   installing first and second pin portions to the first set of bevel pinions, each of the first and second pin portions extending through the collar, through an associated one of the first set of bevel pinions and engaging the differential case;
   installing a first pinion shaft to the second set of bevel pinions, the first pinion shaft extending through the collar and the second set of bevel pinions, the first pinion shaft having opposite ends that engage the differential case; and
   installing a retainer to at least two of the first pin portion, the second pin portion and the first pinion shaft, the retainer being received radially inwardly of the collar, the retainer limiting axial movement of the first and second pin portions along a pinion axis about which the first set of bevel pinions rotate.

17. The method for assembling the automotive differential of claim 16, wherein the retainer is a clip.

18. The method for assembling the automotive differential of claim 17, wherein the clip includes a plurality of legs that are inserted into holes formed through the at least two of the first pin portion, the second pin portion and the first pinion shaft.

19. The method for assembling the automotive differential of claim 18, wherein at least one of the legs carries a resilient barb that engages an associated one of the first pin portion, the second pin portion and the first pinion shaft when the legs are inserted into the holes.

20. A differential for an automotive driveline, the differential comprising:
   a differential housing defining an internal cavity, an axle bore and first and second pinion bores, the axle bore being disposed through the differential housing and intersecting the internal cavity, the axle bore being disposed about a rotational axis of the differential housing, the first and second pinion bores being perpendicular to one another and perpendicular to the rotational axis;
   first and second bevel side gears received in the internal cavity and disposed about the rotational axis;
   a first pinion shaft received in the first pinion bore and coupled to the differential housing;
   a first set of bevel pinions rotatably disposed on the first pinion shaft and meshingly engaged with the first and second bevel side gears;
   a second set of bevel pinions meshingly engaged with the first and second bevel side gears; and
   a retainer assembly received in the second pinion bore and supporting the second set of bevel pinions for rotation thereon, the retainer assembly including first and second pin portions and a clip, the first pin portion being received in a first side of the second pinion bore and through a first one of the second set of bevel pinions, the second pin portion being received in a second side of the second pin bore and through a second one of the second set of bevel pinions, the clip having a plurality of leg members, each of the leg members being received through a hole formed in at least two of the first pin portion, the second pin portion and the first pinion shaft, at least one of the leg members carrying a deflectable barb that deflects to an engaging position after the clip has been installed, the engaging position resisting withdrawal of the leg members from the holes.

21. The differential for an automotive vehicle of claim 20, wherein the retainer further includes a collar, the collar being an annular structure that is disposed about the rotational axis radially inwardly of the first and second sets of bevel pinions, the collar having a first set of collar apertures and a second set of collar apertures, wherein the first pinion shaft is received through the first set of collar apertures, wherein the first pin portion is received in the second set of collar apertures, wherein the second pin portion is received in the second set of collar apertures and wherein the holes are radially inwardly of the collar.

* * * * *